United States Patent
Chudnovsky et al.

(10) Patent No.: US 7,881,963 B2
(45) Date of Patent: Feb. 1, 2011

(54) CONNECTING INTERNET USERS

(76) Inventors: Stan Chudnovsky, 2319 Easton Dr., Burlingame, CA (US) 94010; Adrian B. Danieli, 547 Kirkham St., San Francisco, CA (US) 94122; James P. Currier, 373 E. Strawberry Dr., Min Valley, CA (US) 94941

( * ) Notice: Subject to any disclaimer, the term of this patent is extended or adjusted under 35 U.S.C. 154(b) by 1415 days.

(21) Appl. No.: 11/116,058

(22) Filed: Apr. 27, 2005

(65) Prior Publication Data
US 2005/0273351 A1 Dec. 8, 2005

Related U.S. Application Data

(60) Provisional application No. 60/565,959, filed on Apr. 27, 2004.

(51) Int. Cl.
*G06F 17/60* (2006.01)
*G06Q 30/00* (2006.01)

(52) U.S. Cl. ............. 705/14.16; 705/14.49; 705/14.66; 705/14.67; 705/14.73

(58) Field of Classification Search .................. 705/14, 705/10, 14.49, 14.66, 14.67, 14.73, 14.16
See application file for complete search history.

(56) References Cited

U.S. PATENT DOCUMENTS

| | | | | | |
|---|---|---|---|---|---|
| 4,348,740 | A * | 9/1982 | White | ......................... | 709/253 |
| 4,682,956 | A * | 7/1987 | Krane | ......................... | 434/237 |
| 5,326,270 | A * | 7/1994 | Ostby et al. | .................. | 434/362 |
| 5,380,991 | A * | 1/1995 | Valencia et al. | ............. | 235/383 |
| 6,014,634 | A * | 1/2000 | Scroggie et al. | ............... | 705/14 |
| 6,029,141 | A * | 2/2000 | Bezos et al. | .................. | 705/27 |
| 6,222,914 | B1 * | 4/2001 | McMullin | .............. | 379/144.01 |
| 6,321,208 | B1 * | 11/2001 | Barnett et al. | ................. | 705/14 |
| 6,321,984 | B1 * | 11/2001 | McCall et al. | .............. | 235/381 |
| 6,519,571 | B1 * | 2/2003 | Guheen et al. | ................ | 705/14 |
| 6,527,557 | B2 * | 3/2003 | Lemay et al. | ............... | 434/236 |
| 6,904,408 | B1 * | 6/2005 | McCarthy et al. | .............. | 705/2 |
| 6,965,868 | B1 * | 11/2005 | Bednarek | ....................... | 705/9 |

(Continued)

*Primary Examiner*—John G Weiss
*Assistant Examiner*—Adam Chornesky
(74) *Attorney, Agent, or Firm*—Chadbourne & Parke LLP; Walter G. Hanchuk

(57) ABSTRACT

In one embodiment, the invention is a method. The method includes providing an offer to a connector. The method also includes receiving responses from users to the offer, the users having received the offer from the connector. The method further includes completing the transaction with the users.

In another embodiment, the invention is an apparatus. The apparatus includes a set of profiles of users. The apparatus further includes a database of connectors, connectors of the database selected from the users based on the profiles associated with the users. The apparatus also includes an interface between vendors and the database. The interface is to receive queries from the vendors and to return connector identities responsive to the queries.

In yet another embodiment, the invention is a machine-readable medium embodying instructions. The instructions, when executed by a processor, cause the processor to perform a method. The method includes providing an offer to a connector. The method also includes receiving responses from users to the offer, the users having received the offer from the connector. The method further includes completing the transaction with the users.

In still another embodiment, the invention is a method. The method includes receiving an offer as a connector from a vendor. The method also includes propagating the offer to associated users through a network.

22 Claims, 12 Drawing Sheets

U.S. PATENT DOCUMENTS

| | | | |
|---|---|---|---|
| 7,185,065 B1* | 2/2007 | Holtzman et al. | 709/217 |
| 7,328,231 B2* | 2/2008 | LaCroix et al. | 709/200 |
| 7,370,003 B2* | 5/2008 | Pych | 705/10 |
| 7,370,073 B2* | 5/2008 | Yen et al. | 709/203 |
| 7,403,905 B2* | 7/2008 | Shioda et al. | 705/14.64 |
| 7,480,627 B1* | 1/2009 | Van Horn et al. | 705/26 |
| 7,653,743 B2* | 1/2010 | Kamentsky et al. | 709/244 |
| 2001/0032167 A1* | 10/2001 | Tulloch et al. | 705/37 |
| 2001/0048449 A1* | 12/2001 | Baker | 345/758 |
| 2002/0042739 A1* | 4/2002 | Srinivasan et al. | 705/14 |
| 2002/0077904 A1* | 6/2002 | Ali | 705/14 |
| 2002/0120506 A1* | 8/2002 | Hagen | 705/14 |
| 2002/0152118 A1* | 10/2002 | Hadjigeorgis | 705/14 |
| 2002/0161645 A1* | 10/2002 | Walker et al. | 705/14 |
| 2002/0194112 A1* | 12/2002 | dePinto et al. | 705/37 |
| 2003/0005056 A1* | 1/2003 | Yamamoto et al. | 709/205 |
| 2003/0018530 A1* | 1/2003 | Walker et al. | 705/14 |
| 2003/0055722 A1* | 3/2003 | Perreault et al. | 705/14 |
| 2003/0074298 A1* | 4/2003 | Daum | 705/37 |
| 2003/0074397 A1* | 4/2003 | Morin et al. | 709/203 |
| 2003/0126015 A1* | 7/2003 | Chan et al. | 705/14 |
| 2003/0135440 A1* | 7/2003 | Senga | 705/37 |
| 2003/0167206 A1* | 9/2003 | Shirai | 705/16 |
| 2003/0233310 A1* | 12/2003 | Stavrovski | 705/37 |
| 2004/0073480 A1* | 4/2004 | Nahmias | 705/14 |
| 2004/0103022 A1* | 5/2004 | Chilcoat et al. | 705/14 |
| 2004/0230518 A1* | 11/2004 | Senga | 705/37 |
| 2004/0238622 A1* | 12/2004 | Freiberg | 235/380 |
| 2004/0249700 A1* | 12/2004 | Gross | 705/10 |
| 2004/0267663 A1* | 12/2004 | Karns et al. | 705/40 |
| 2005/0080737 A1* | 4/2005 | Stein et al. | 705/42 |
| 2005/0149393 A1* | 7/2005 | Leof | 705/14 |
| 2005/0165657 A1* | 7/2005 | Aichroth et al. | 705/26 |
| 2005/0171838 A1* | 8/2005 | Eglinton | 705/14 |
| 2005/0251442 A1* | 11/2005 | Ficalora | 705/14 |
| 2005/0273351 A1* | 12/2005 | Chudnovsky et al. | 705/1 |
| 2006/0010034 A1* | 1/2006 | Sparks | 705/14 |
| 2006/0106678 A1* | 5/2006 | Walker et al. | 705/26 |

* cited by examiner

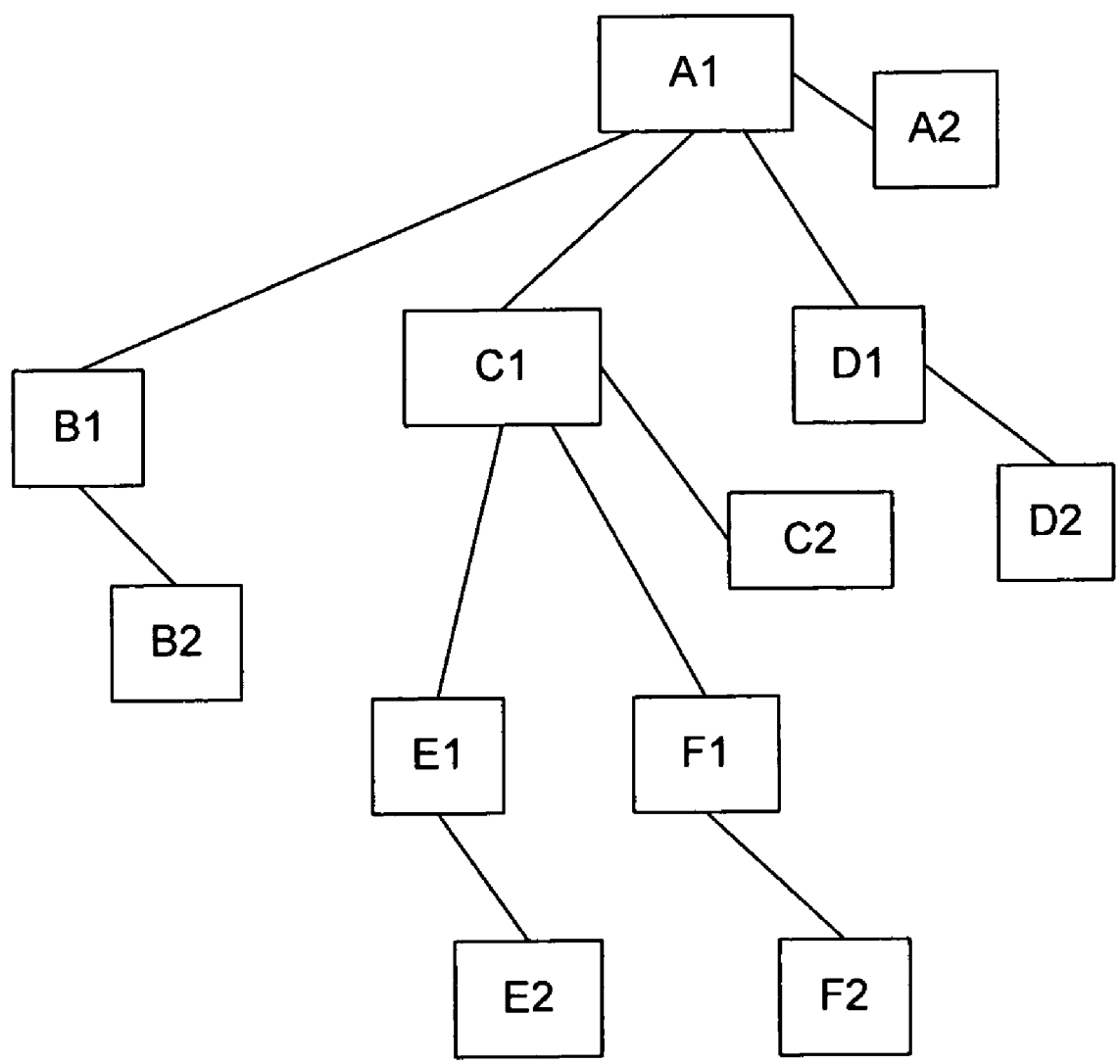

CONNECTING INTERNET USERS

The application claims priority under 35 USC 119(e) to the U.S. Provisional Application 60/565,959, filed on Apr. 27, 2004.

FIELD

The present invention relates to the field of Internet commerce. More particularly, the present invention relates to group marketing through a machine interface.

BACKGROUND

Connecting buyers to sellers is the purpose of a marketplace, and is the age-old problem in all commercial systems. With the advent of the Internet, new avenues for buyers and sellers to connect have opened, with many websites devoted to purchases and marketing. For direct-to-consumer marketing, websites have been useful, but such websites typically require that the consumer proactively access the website. In non-Internet contexts, salespeople can steer customers to buying opportunities. However, classic salespeople are not available to cause users to make an affirmative choice to go to a website.

Prompting this affirmative choice, Internet technology evolved to include banner advertisements, pop-up advertisements, keyword advertisements, and overlay advertisements among other techniques. Each of these techniques involves some form of advertisement and typically includes a "link" or other opportunity to go to the website of the vendor in question. Unfortunately, click-through rates on such advertising are typically small.

Another phenomenon associated with the Internet is grouping of users because of shared interests. Accordingly, it may be useful to identify interested buyers and present an opportunity to purchase to such identified buyers. Moreover, it may be useful to provide rewards for access to interested buyers.

SUMMARY

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

An apparatus and method for connecting Internet users and its monetization is described and illustrated. In one embodiment, the invention is a method. The method includes providing an offer to a connector. The method also includes receiving responses from users to the offer, the users having received the offer from the connector. The method further includes completing the transaction with the users.

In another embodiment, the invention is an apparatus. The apparatus includes a set of profiles of users. The apparatus further includes a database of connectors, connectors of the database selected from the users based on the profiles associated with the users. The apparatus also includes an interface between vendors and the database. The interface is to receive queries from the vendors and to return connector identities responsive to the queries.

In yet another embodiment, the invention is a machine-readable medium embodying instructions. The instructions, when executed by a processor, cause the processor to perform a method. The method includes providing an offer to a connector. The method also includes receiving responses from users to the offer, the users having received the offer from the connector. The method further includes completing the transaction with the users.

In still another embodiment, the invention is a method. The method includes receiving an offer as a connector from a vendor. The method also includes propagating the offer to associated users through a network.

BRIEF DESCRIPTION OF THE DRAWINGS

FIG. 12 illustrates relationships between users with coupons or offers in one embodiment.

DETAILED DESCRIPTION

Figure 1:
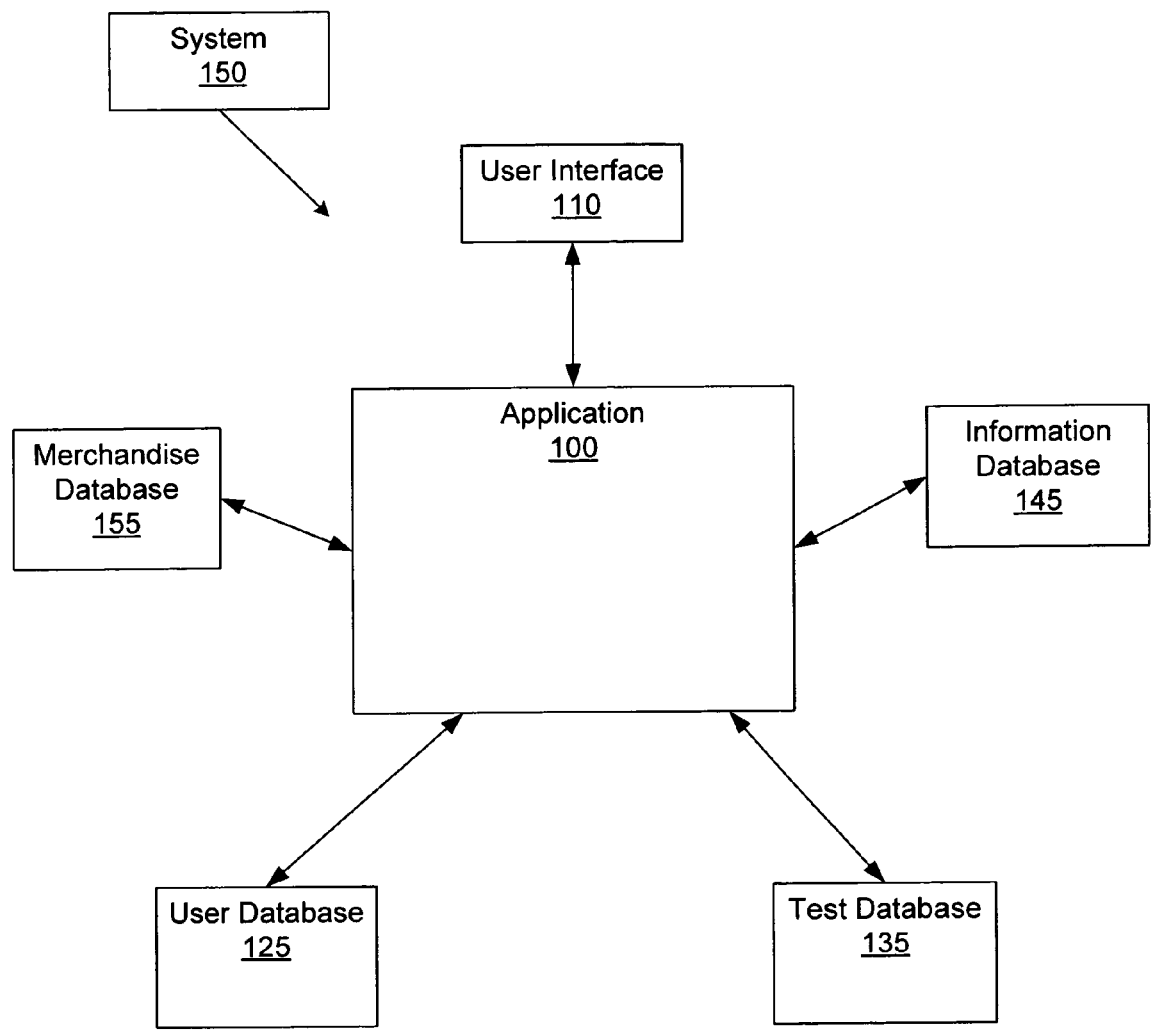
FIG. 1 illustrates relationships between an embodiment of an application for user interaction and various other modules or data stores, such as may be embodied in a medium or in media.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

An apparatus and method for connecting Internet users and its monetization is described and illustrated. In one embodiment, the invention is a method. The method includes providing an offer to a connector. The method also includes receiving responses from users to the offer, the users having received the offer from the connector. The method further includes completing the transaction with the users.

In another embodiment, the invention is an apparatus. The apparatus includes a set of profiles of users. The apparatus further includes a database of connectors, connectors of the database selected from the users based on the profiles associated with the users. The apparatus also includes an interface between vendors and the database. The interface is to receive queries from the vendors and to return connector identities responsive to the queries.

In yet another embodiment, the invention is a machine-readable medium embodying instructions. The instructions, when executed by a processor, cause the processor to perform a method. The method includes providing an offer to a connector. The method also includes receiving responses from users to the offer, the users having received the offer from the connector. The method further includes completing the transaction with the users.

In still another embodiment, the invention is a method. The method includes receiving an offer as a connector from a vendor. The method also includes propagating the offer to associated users through a network.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

FIG. 1 illustrates relationships between an embodiment of an application and various other modules or data stores, such as may be embodied in a medium or in media. The application communicates with users through a user interface and accesses data in various databases or data stores. Note that the term databases is used for any collection of information, whether organized as a relational database (for example) or stored in some other manner.

Within system 150, application 100 communicates with users through user interface 110, which may be a website user interface or other graphical user interface for example. Based on its communication with a user, application 100 accesses data in each of user database 125, test database 135, information database 145 and merchandise database 155. The databases described may be well defined or may represent a collection of data such as may be found in a directory structure accessible through a file system for example.

In one embodiment, the user database 125 includes user profiles which encompass user login information, user history with the application 100, personal user information, and results of user interaction with test database 135, information database 145 and merchandise database 155 for example. In such an embodiment, test database 135 includes tests of various types which may be administered, along with information indicating how to analyze results of responses to the tests and information indicating relationships between the various tests.

Moreover, in such an embodiment, information database 145 includes reference or instructional information on a variety of topics, such as how to interpret test results, self-help information, relationship information, career information, or other information topics which may be of interest to a user or users. Also, in such an embodiment, merchandise database 155 includes information about goods or services for sale, and about merchants offering goods or services for example. Merchandise refers to that which may be offered (such as services or goods for example), rather than strictly to material goods in this context.

In response to a user query through user interface 110, application 100 may present information from information database 145, administer a test from test database 135, lookup user information in user database 125 or lookup desired goods and/or services in merchandise database 155. Similarly, application 100 may update profile information in user database 125 responsive to user requests or actions, or inventory information in merchandise database 155 for example. Other modifications may be appropriate, depending on the form and availability of the various databases.

Figure 2:
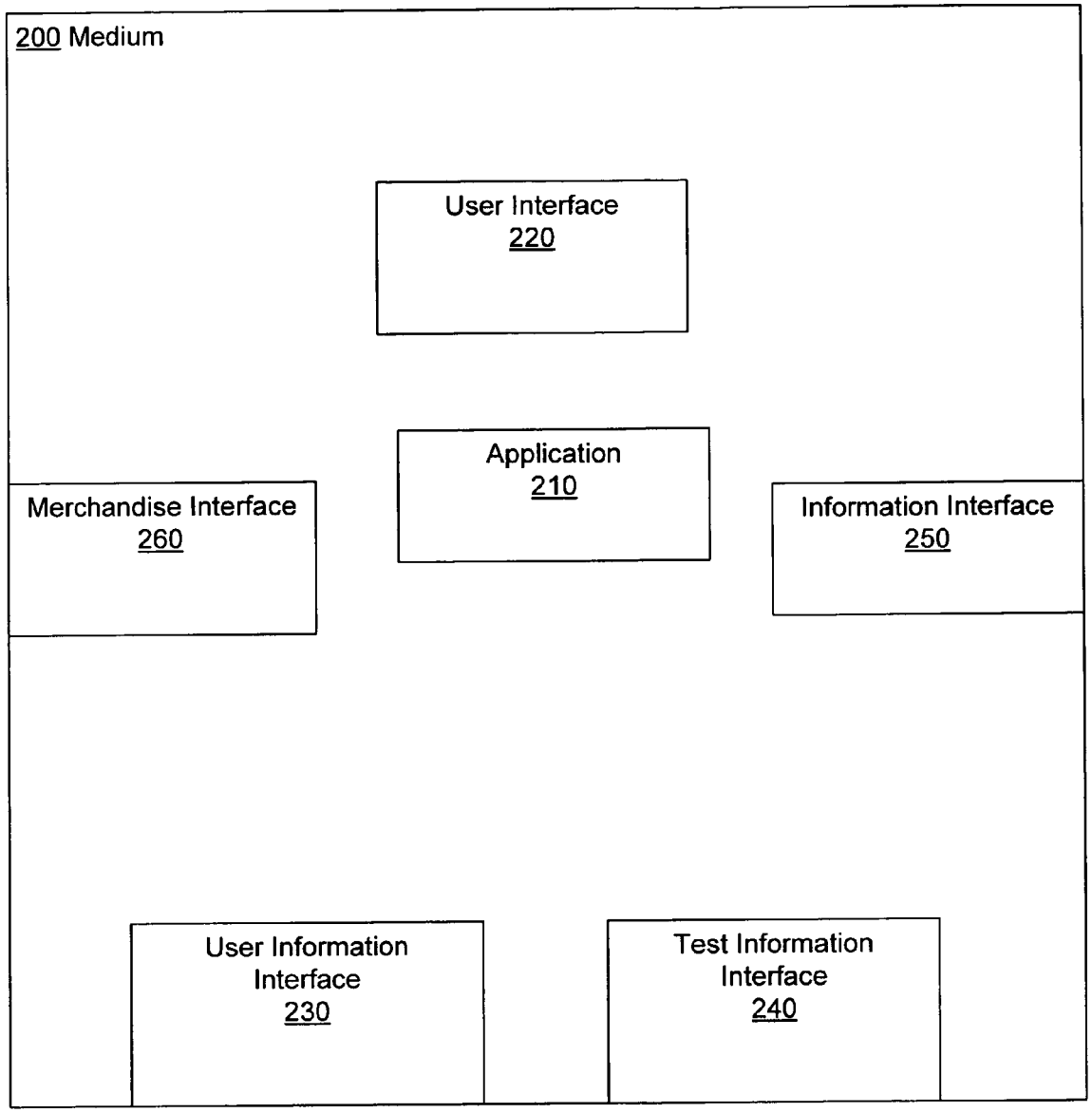
FIG. 2 illustrates an embodiment of a user interaction application as it may be embodied in a medium or in media.

The application of FIG. 1 may be embodied in a variety of ways, either as an apparatus or as a method. FIG. 2 illustrates an embodiment of an application as it may be embodied in a medium or in media. Machine-readable media may embody instructions, which, when executed by a processor, cause the processor to act, thereby carrying out a method or uniquely configuring an apparatus. In one embodiment, a medium includes an application and a variety of interfaces allowing the application to communicate with a user and access (for both read and write purposes) data in various data stores.

As illustrated, medium 200 includes application 210, the application which receives commands or otherwise interacts with a user and manipulates data responsive to interaction with the user and a host processor or system. Medium 200 also includes a user interface 220, which may be executed or operated to communicate with the user. Note that medium 200 is depicted as a single, integrated or unitary medium. However, medium 200 may actually be a collection of media of the same or different types as appropriate in a particular embodiment or implementation. Medium 200 further includes user information interface 230, test information interface 240, information interface 250, and merchandise interface 260.

User information interface 230 may be executed or operated to obtain information (such as personal information or login information for example) from a user information database such as user database 125. Test information interface 240 may be executed or operated to obtain information from a test database such as test database 135 (such as tests or relationships between tests for example). Information interface 250 may be executed or operated to obtain information from an information database such as information database 145 (such as web pages or documents from a directory structure for example). Merchandise interface 260 may be executed or operated to obtain data (such as merchandise characteristics or availability for example) from a merchandise information database such as merchandise database 155.

Tests used by an application may have a variety of relationships and a variety of storage methodologies. All of these relationships may be maintained within a relational database of test for example, along with numerous other relationships not shown. Alternatively, tests may be stored as individual files within a file system, and the file system may include various forms of links to other tests (files) within the file system. The links between various tests may be used to determine a progression of tests, or select among various progressions of tests. Similarly, when several tests are linked, the various links may provide a basis for presenting a set of tests, one of which is administered as a progressive test. Moreover, tests that are not directly linked may be correlated through use of links to intermediate tests, potentially resulting in a suggestion to administer an intermediate test to collect additional information.

Figure 11:
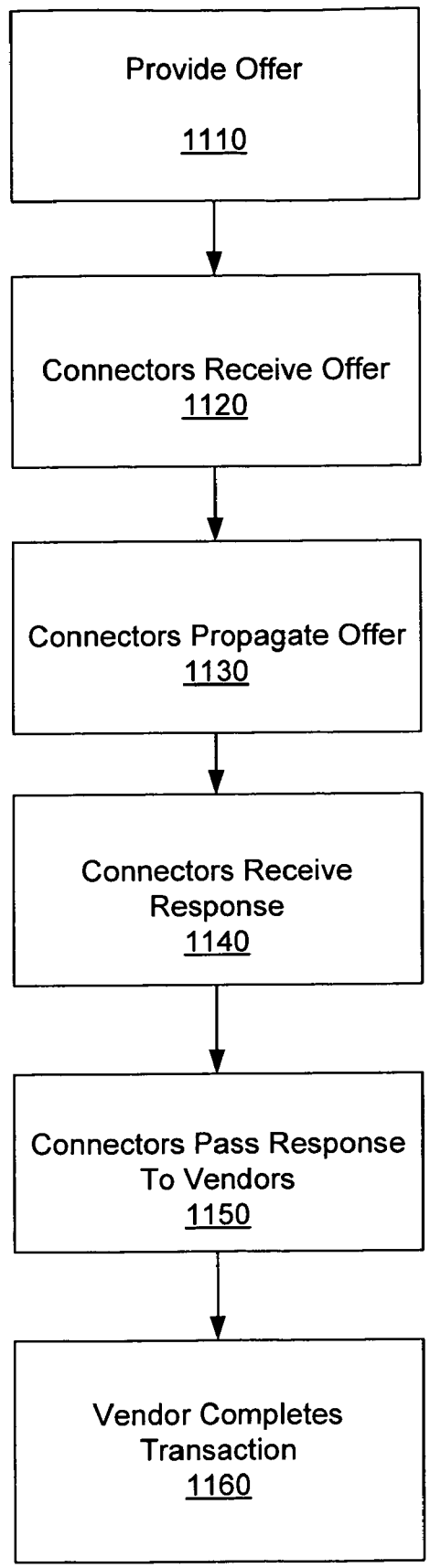
FIG. 11 illustrates an embodiment of a process of interaction between a group and a vendor.

Similarly, users of an application may be related in a variety of ways. FIG. 11 illustrates an embodiment of a process of interaction between a group and a vendor. This interaction depends on the relationships between members of the group. The method illustrated includes a number of modules that may be executed or operated in a serial or parallel fashion, for example. At module 1110, an offer is provided to a connector or set of connectors. These connectors are expected to propagate the offer through the Internet. At module 1120, the connectors receive the offer. At module 1130, the connectors propagate the offer to directly and indirectly connected or coupled people through the Internet or a similar network, such as a network designed around a progressive testing facility. At module 1140, responses to the offer arrive with the connector(s). At module 1150, the connector(s) pass the responses along to the vendor. At module 1160, the vendor completes the transaction.

In some embodiments, variations of the method may be used. For example, responses need not flow through the connectors, they may be sent directly to the vendor. Similarly, offers of various forms may be used, such as circulating coupons, group offers, progressive coupons, sponsored offers (wherein a connector or third-party contributes to the vendor's offer), or other forms of offers. In some such circumstances, a threshold level of responses (acceptances) may need to be met, either as a percentage of responses or as a predetermined quantity of responses for example.

A number of different mechanisms connecting buyers to sellers may be understood with reference to FIG. 12. For example, various embodiments may be understood from FIG. 12, including embodiments using circulating coupons, group offers, progressive coupons, connectors circulating coupons, and connectors forming groups. Each of these embodiments, along with other embodiments, may use a structure as illustrated in FIG. 12 under various circumstances.

As illustrated in FIG. 12, user A1 has associated therewith data A2. User A1 propagates data A2 or data derived from data A2 to user B1, user C1 and user D1. Such propagation may occur simultaneously, concurrently, serially, sequentially, or otherwise. Consequently, user B1 has associated therewith data B2, user C1 has associated therewith data C2, and user D1 has associated therewith data D2. Additionally, user C1 may further propagate data, such that user E1 has associated therewith data E2 and user F1 has associated therewith data F2. This basic model may apply to a variety of embodiments.

In a first embodiment, each of data A2-F2 represent an electronic coupon. Such an electronic coupon may take the form of a code to be entered at a website, data that may be provided as a paper coupon, or a pointer to a restricted-access website, among other forms. Such a coupon may not be active until a predetermined number of people have received it (a group coupon), it has been sent to a predetermined number of people (a circulating coupon), or it has been used by a predetermined number of people (a progressive coupon). Alternatively, the coupon may have an initial value that may increase based on usage threshold(s) or reception threshold(s). Note that reception/circulation/forwarding may be tracked using embedded code or by tracking access to an URL where data referenced by the coupon may be found. Moreover, rather than increasing value, reaching thresholds may result in initial or increasing rewards (e.g., points, miles, rebates, etc.) related to the coupon.

In the connector context, user A1 may be a connector circulating a coupon A2. Users B1, C1 and D1 may be directly connected to or coupled to connector A1. Users B1 and F1 may automatically receive instances of the coupon or may receive them responsive to action by user C1. Again, these instances of coupons may be progressive, circulating, or result in group discounts and/or benefits. Moreover, the coupons may also be stable, with a predetermined and unchanging value or benefit. Additionally, other rewards or benefits may accrue to the connector because of coupon use attributable to the connector.

In the context of group offers, users A1-F1 may be previously identified as sharing a common interest. Data A2-F2 may represent an offer to the group to purchase a good or service. The offer may provide a static or progressive discount or special price. Alternatively, the offer may require a predetermined number of acceptances, percentage of acceptances, or volume of orders to activate the offered discount or price. Acceptances may be conditioned on activation of the offer. Note that an offer in this context may be an offer to bargain rather than a legally binding offer.

In yet another embodiment, a connector may be provided an opportunity to form a purchasing group. The connector A1 may distribute instances of an offer A2 to potential members of a group of purchasers B1-F1 as instances B2-F2. Offer A2 may provide for a static or dynamic discount on purchase of a good or service. Alternatively, offer A2 may relate to a reward such as points, miles, rebates or other inducements for purchase of a good or service. The inducement or discount may require a predetermined number of purchases to reach an activation threshold or may have tiers of acceptances which correspond to progressively higher levels of inducements or discounts. Moreover, acceptance of offers within the group and/or distribution of the offer to the group may reward the connector.

Research has shown that nearly 80% of Internet messages are generated by approximately 5% of Internet users. Identifying these 5%, who may be referred to as connectors, provides an opportunity for a form of direct or viral marketing. By convincing these connectors to disseminate advertising and offers to purchase or for discounts, a new marketing avenue may be opened. Using rebates, commissions, points, miles or other rewards, some of these connectors may be enticed to participate.

Figure 10:
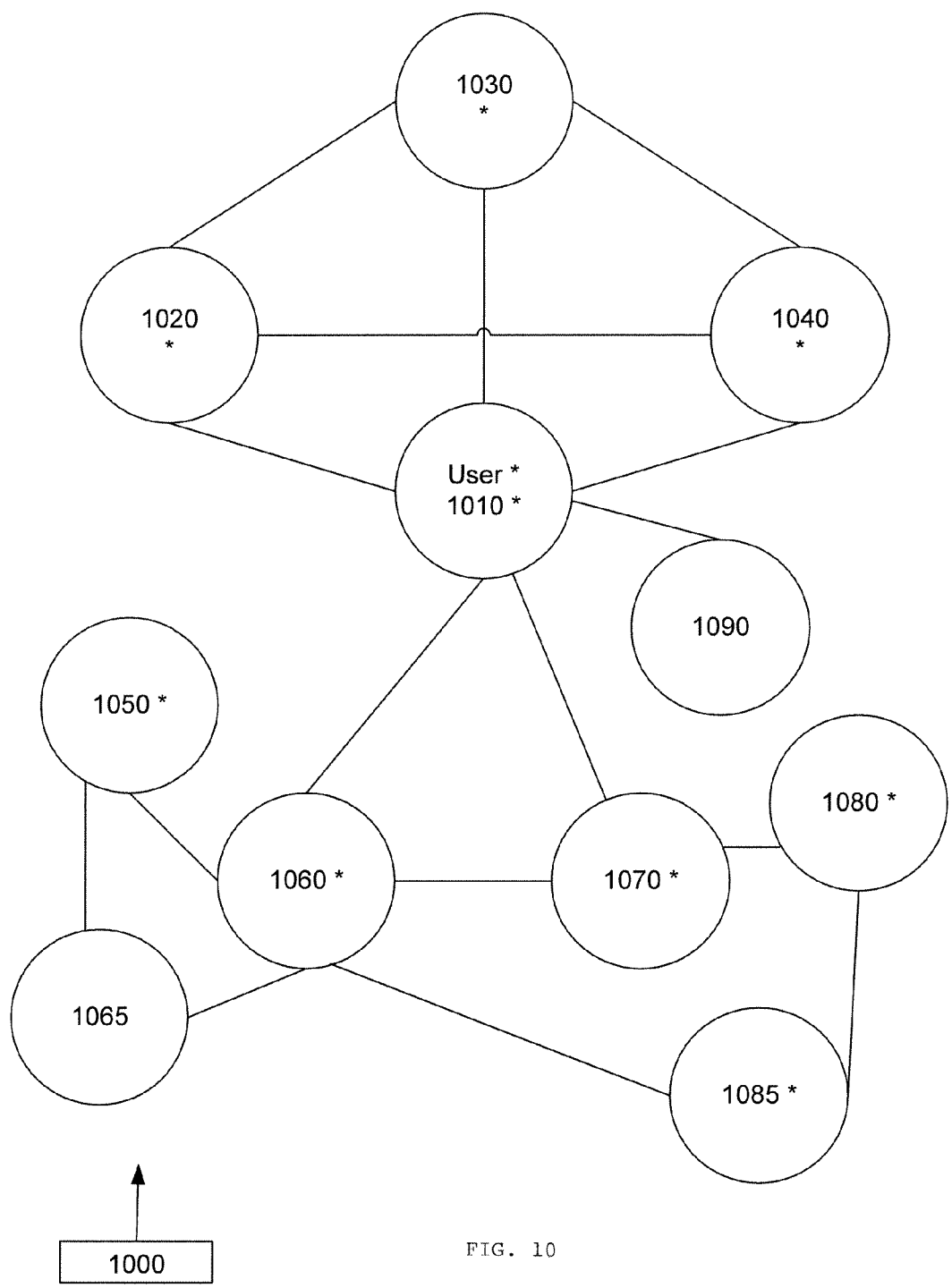
FIG. 10 illustrates relationships between users in one embodiment.

Other relationships between users may also be present. FIG. 10 illustrates relationships between users in one embodiment. Users 1000 are a collection of related users. Alternatively, users 1000 is a database including information related to a number of different users, and representations of similarities or affirmative links between individual users. The database may also be used in an anonymous manner for extracting common data or statistical models based on a statistically significant sample of a population. Correlation within the model may be instructive as to what products or services users are interested in, what common interests various users have, what underlying relationships between users exist, and many other correlated variables.

User 1010 is the user in question (such as a user currently logged in for example). Logically related to user 1010 are users 1020, 1030 and 1040. The illustrated links between users 1010, 1020, 1030 and 1040 are links deduced by the system which have not been affirmed or requested by user 1010 or by some combination of users 1010, 1020, 1030 and 1040. For example, user 1010 may be a sibling of user 1030 and a child of users 1020 and 1040, with users 1020 and 1040 being either spouses or ex-spouses for example. Such relationships within the set of users may be formalized or recognized as necessary or as requested. However, the relationships may also be utilized for their effects on a profile of user 1010 without formal recognition. Similarly, user 1090 may be a co-worker of user 1010, thus allowing for a deduced link which need not be formalized.

In contrast, users 1060 and 1070 are positively linked to user 1010, such as by request of user 1010 for example. This may be a result of friendship, other social bonds, or a result of referral to the system by one of the users. User 1060 is also positively linked to each of users 1050 and 1065, each being linked to each other. Moreover, user 1060 is positively linked to each of users 1070 and 1085, each positively linked to user 1080.

In one embodiment, these positive links allow for communication between users within the system (for example, email may only be sent to users accessible through a direct positive link, or through traversal of a series of positive links). Thus, user 1010 may be able to send email only to 1060 and 1070, or only to 1050, 1060, 1065, 1070, 1080 and 1085 for example. Additionally, user 1010 may have well-defined connections only to users 1060 and 1070 within the system 1000.

Also illustrated are common characteristics, shown by symbols within the users. For example, users 1010, 1050 and 1070 each have a 'X' indicating a common characteristic. This may be due to an affirmative indication from each of the users in question, or from deduction through statistical profiling of the users in question. For example, this common characteristic may be interest in a form of art of a specific athletic endeavor. Similarly, users 1010, 1030, 1060, 1080 and 1085 each have a '*' indicating a different common characteristic. Again, the common characteristic may be deduced or affirmatively selected, and may have a variety of different forms.

Note that the user database 1000 may be correlated to the test database 900, such that test results from tests of test database 900 may be analyzed based on relationships between users in user database 1000. Moreover, history of individual test-taking by a user 1010 may be analyzed by reference to test database 900, with such analysis updated based on changes in test database 900 (such as revised relationships for example). Additionally, correlation of test analysis based on test database 900 and user profile analysis or statistical analysis from user database 1000 may lead to suggestions about purchases, information to browse, or groups to join for example.

Figure 3:
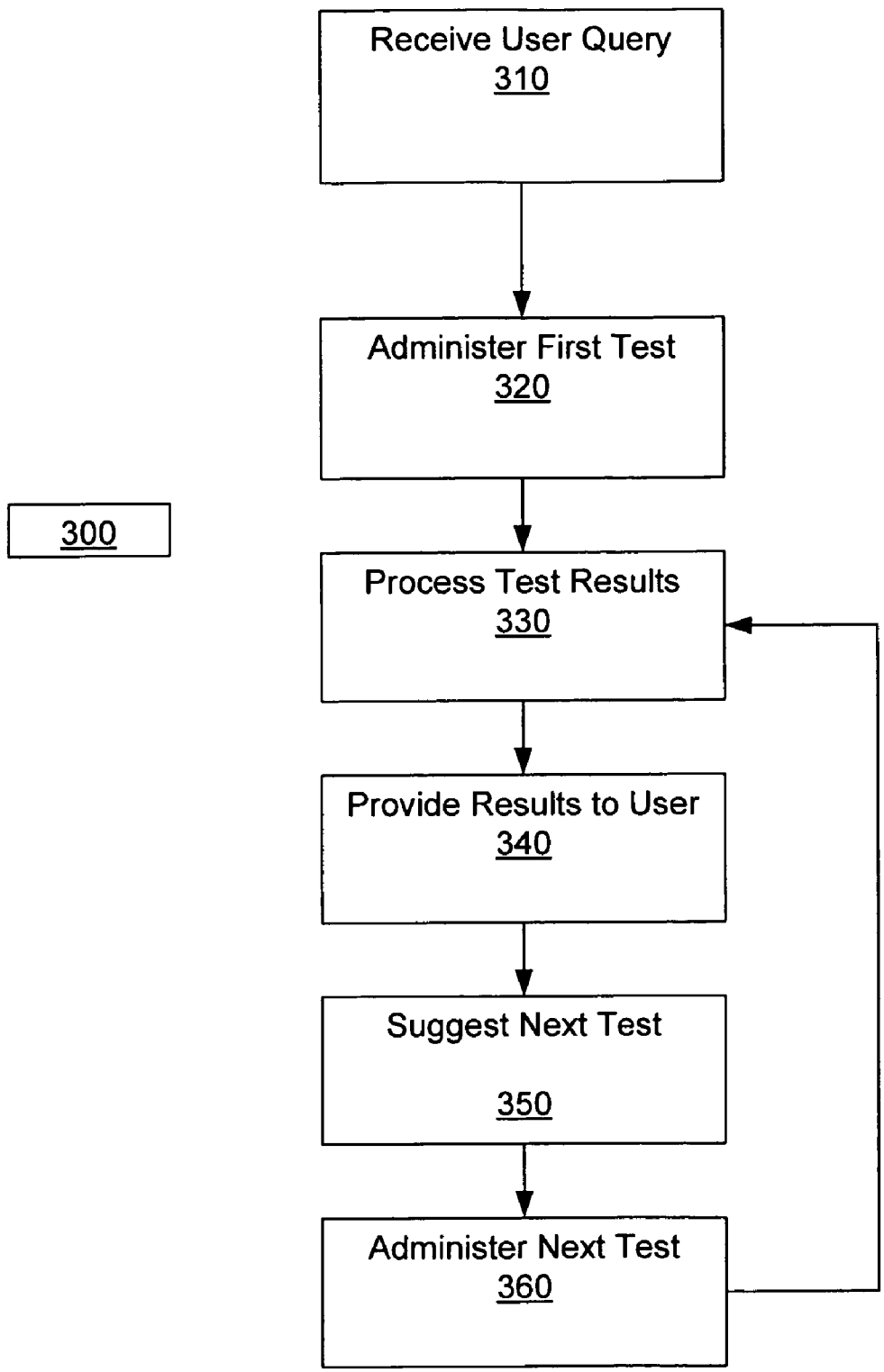
FIG. 3 illustrates an embodiment of an application for data analysis and various other modules or data stores, such as may be embodied in a medium or in media.

Applications may implement a variety of methods. In one embodiment, only tests are progressively administered. FIG. 3 illustrates an embodiment of a method of progressively administering tests 300. The process, in one embodiment, involves administering a first test to a user, processing the results of a test, providing the results (feedback) to the user, and suggesting either a next test, a next set of tests, or a set of potential next tests, whereupon the user may then take the next test and repeat the process of processing and feedback.

Figure 9:
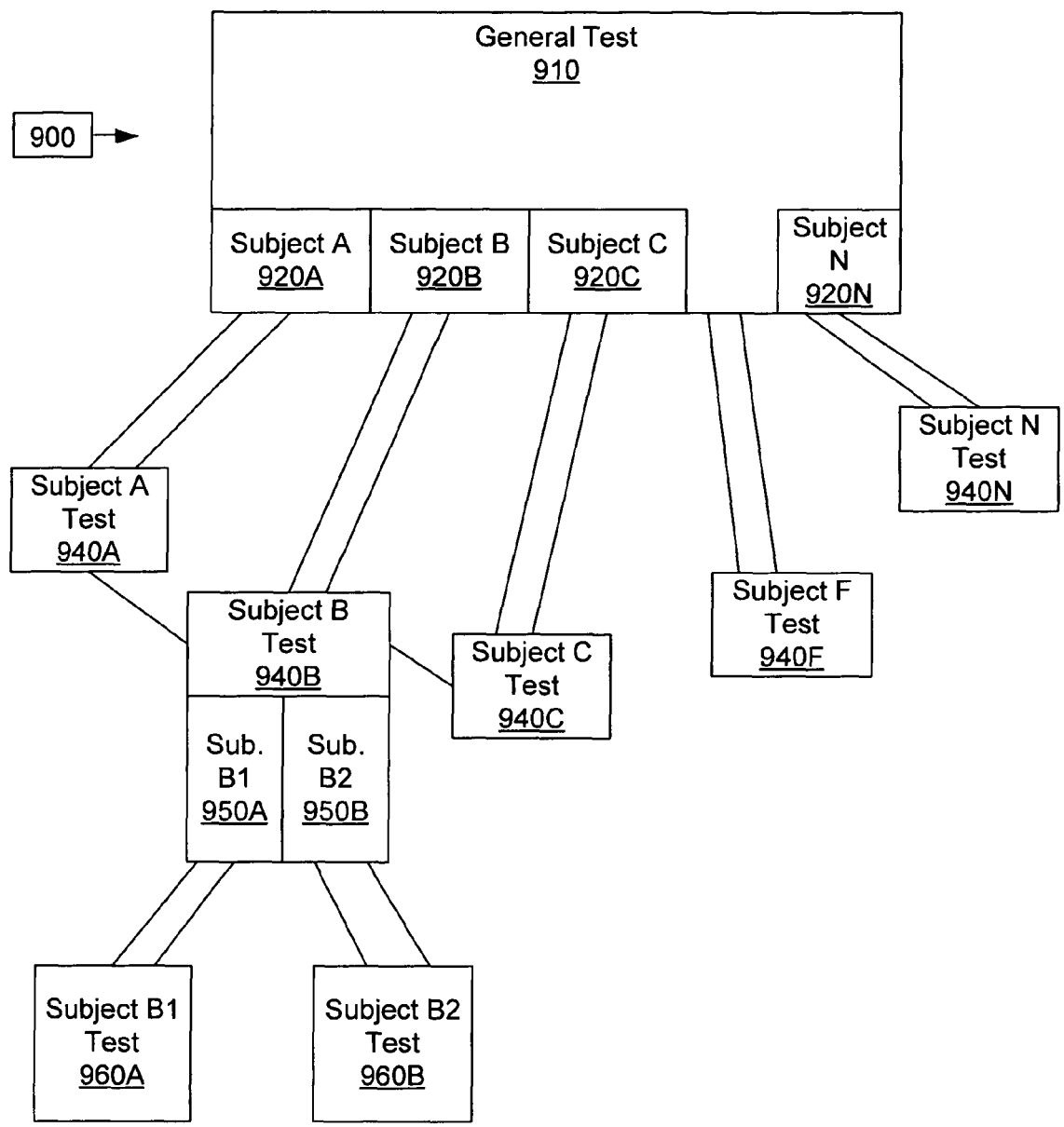
FIG. 9 illustrates relationships between a connector and other users in one embodiment.

As illustrated with respect to FIG. 9, the tests may be progressive in nature, such that a second test, next test, or first progressive test may drill-down or otherwise focus on a single subject from a variety of subjects in a first test or general test. The progressive nature allows for more refined, sophisticated or nuanced analysis of information from the tests collectively, and historical tracking of test results allows for gradual and progressive updating of an analytical picture or profile of a user.

At module 310, a query arrives from a user, indicating interest from the user in taking a first test. This query may represent a more involved process of enrolling a user into a membership group for example, and/or obtaining financial information allowing for monetization of the transaction in which the first test (or future tests) is administered. The query may also be as simple as clicking on a link on a website which leads to administration of the first test.

At module 320, the first test is administered. The first test may be a predetermined test, or a test selected from a predetermined set of tests. In some embodiments, the first test is a personality test designed to provide information about the preferences and personality of the user, assuming a reasonable attempt to faithfully take the test (rather than answering questions outrageously for example).

At module 330, the results of the test (such as the first test) are processed, thereby analyzing some aspect of the user (such as IQ or intelligence quotient, personality, knowledge of financial principles, for example). At module 340, feedback is provided to the user in the form of test results, either as a score, an analysis of correct and incorrect answers, an analysis of trends in answers, some combination of all of these, or some other form of feedback. The feedback may be separate from other interactions with the user, or may be combined with the suggestion of module 350 for example.

At module 350, a next test is suggested, based in part on the results of the test(s) already administered and processed for the user. The next test may be a single identified test, a set of tests from which a choice may be made, or a series of several tests (some or all of which may ultimately be administered). At module 360, the next test is administered, and the process then moves to module 330 for processing of the results of the next test. In this manner, the loop may be iterated several times, to refine results of tests and explore additional facets of a person. Furthermore, the tests may each be monetized, and feedback may be monetized, allowing for fees for administering the tests or for providing either any analysis, or in-depth analysis beyond free superficial analysis.

Figure 4:
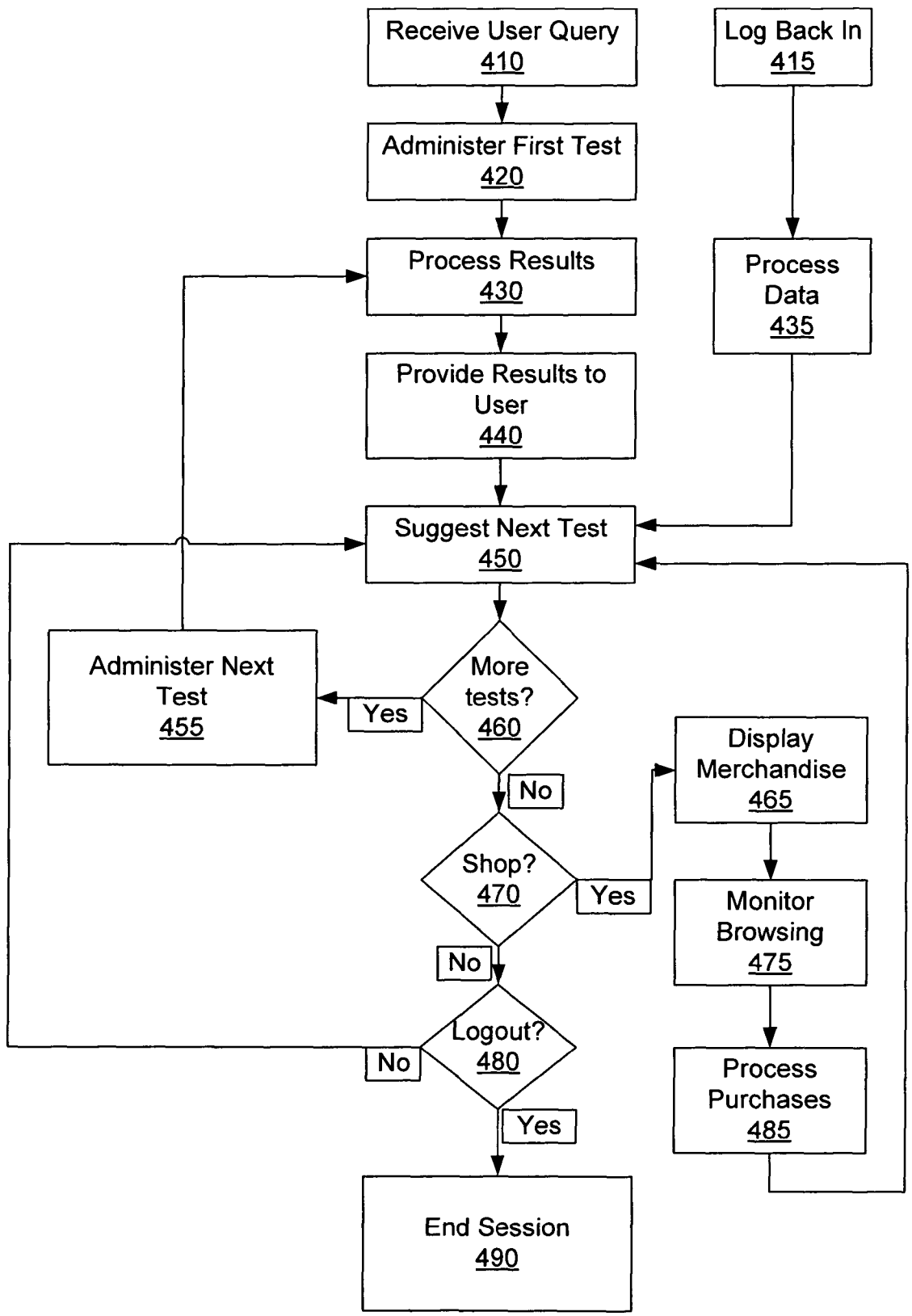
FIG. 4 illustrates an embodiment of an analysis application as it may be embodied in a medium or in media.

A more complex embodiment of a method may progressively administer tests and sell goods or services. FIG. 4 illustrates an embodiment of a method of progressively administering tests and selling merchandise 400. The process, in one embodiment, involves administering a first test to a user, processing the results of a test, providing the results or feedback to the user, suggesting a next test or assortment of tests. Then, the process includes either administering the next test or monitoring shopping of the user, and revising the proposed next test based on user activity.

At module 410, a user query is received, initiating a session. At module 420, a first test is administered. At module 430, results of a test are processed, analyzing the answers given by the user. At module 440, results of the test are provided as feedback in one form or another to the user. At module 450, a next test is suggested. Note that the modules 410, 420, 430, 440 and 450 may be implemented in a manner similar to that of modules 310, 320, 330, 340 and 350 of FIG. 3 for example.

At module 460, a decision is made as to whether the user will take further tests at this time. If yes, the next test is administered at module 455, and the process returns to module 430. If no (at module 460), a decision is made at module 470 as to whether the user will shop for goods and/or services.

If, at module 470, the decision is yes (to shop), then the process moves to module 465, and merchandise (goods and/or services) is displayed for perusal by the user. As the user browses, and as goods or services are chosen for purchase, this is monitored at module 475. Upon termination of shopping, at module 485, purchases are processed (such as checking out and arranging payment for example), and information from browsing and purchasing is fed back into a profile for the user. Based on the user profile, at module 450, a next test is suggested. This next test may be the same test suggested after analysis of the first test, or may be a different test, reflecting new information gleaned from shopping activities.

If, at module 470, the decision is no (not to shop), the process moves to module 480, and a decision is made by the user as to whether to log out or not. If the user does not log out, the process moves to module 450 and a next test is suggested. If the user logs out, the process ends the session at module 490. The user may then log back in at module 415, avoiding the original first test. At module 435, data that the system has received since the last session for the user is processed. This data may be statistical modeling data, or information from other users, either linked to the user through a network, or related to the user in some way, such as by family relation, social or professional relationship. The process then moves to module 450, and a next test is suggested based on this updated profile of the user.

Note that administering tests and providing results may be monetized as discussed with respect to FIG. 3. Moreover, this monetization may be linked to shopping; leading to discount programs, free tests in response to shopping at affiliated merchants, and running accounts of credits or debits in a user's account. The initial user query may involve arranging for payment for services, either through credit or debit processes, or through periodic billing for example. Such credit or debit processes may involve interaction with credit accounts, deposit accounts of a bank, credit union or similar financial institution, cash deposits or other deposits at a point-of-sale terminal, or maintenance of an internal balance within a system using the methods and/or apparatuses described herein. Furthermore, note that monetization may permeate the system, as an option in every module of a process for example, and may relate to payments by a sponsor to allow a user to utilize the system. When a sponsor is involved, identification of the sponsor in the process may occur, or perception of an advertisement from the sponsor may be involved, with perception including visual, audio, or other forms of perception.

Figure 5:
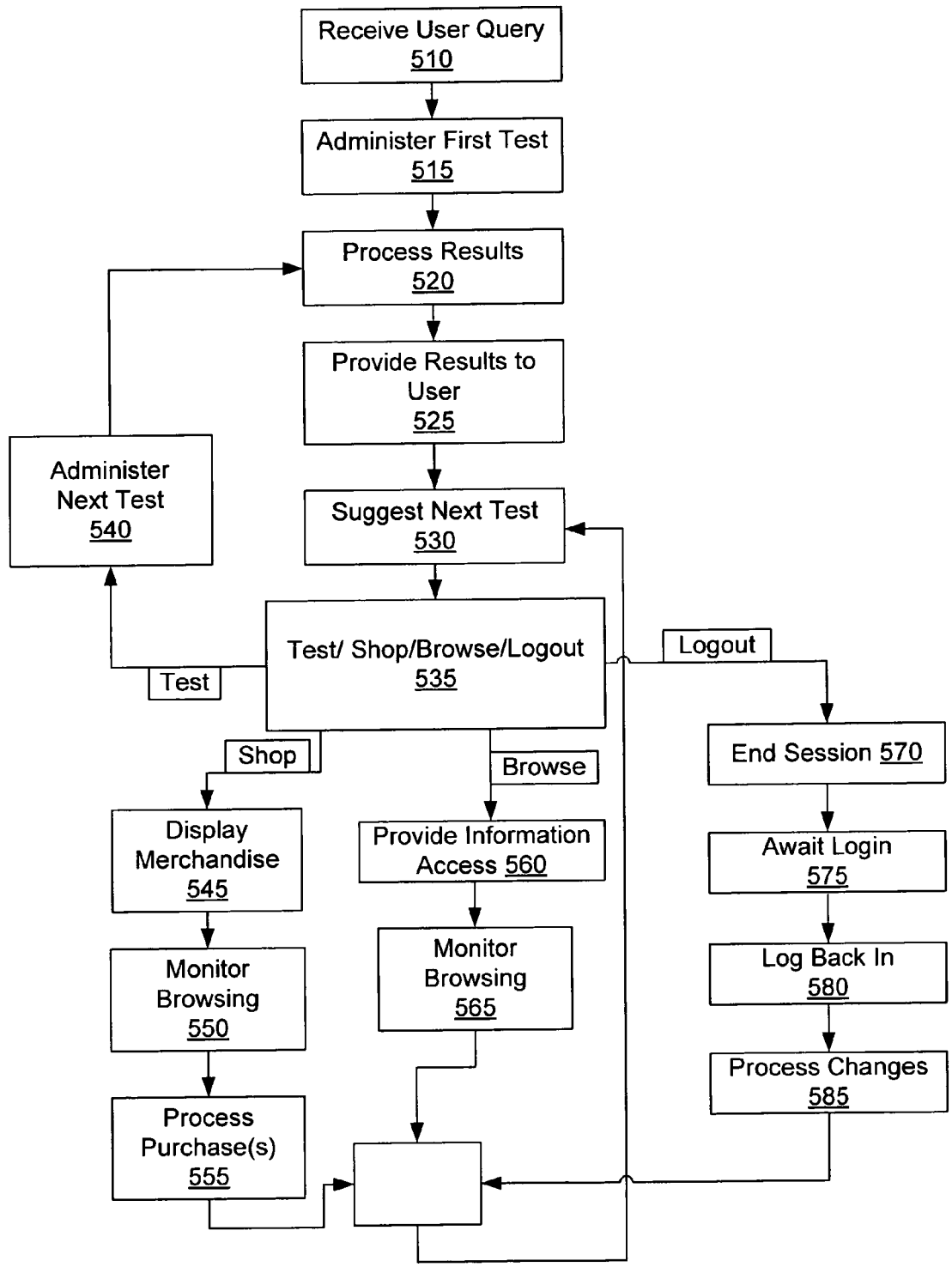
FIG. 5 illustrates an embodiment of a method of progressively administering tests, providing information and selling merchandise.

Yet another complex embodiment may be used to progressively administer tests, sell goods and services, and provide information. FIG. 5 illustrates an embodiment of a method of progressively administering tests, providing information and selling merchandise 500. The process, in one embodiment, includes administering a first test, processing and providing results of a test, and suggesting a next test or assortment of tests. Then, the user may either take the next test, shop, or browse for information (or logout and come back later). Based on the user's activities, the proposed next test is revised, and content (information, possibly merchandise) presented to the user is adjusted.

At module 510, a user query is received, initiating a session. At module 515, a first test is administered. At module 520, results of a test are processed, analyzing the answers given by the user. At module 525, results of the test are provided as feedback in one form or another to the user. At module 530, a next test is suggested. Note that the modules 510, 515, 520, 525 and 530 may be implemented in a manner similar to that of modules 310, 320, 330, 340 and 350 of FIG. 3 for example.

At module 535, a determination is made as to what the user will do next. The options include taking a test, shopping, browsing information, and logging out. If the decision is to take a test, then at module 540, the next test is administered, and the process returns to module 520 for processing.

If the decision is to shop, at module 545, merchandise is displayed, potentially in a manner responsive to aspects of the user profile already established. At module 550, browsing and choices for purchases are monitored, both for accounting purposes and for profile building. At module 555, purchases are processed, such as by finalizing a transaction and arranging for delivery or appointments for example. The process then proceeds to module 530, at which point a next test is suggested based on the current contents of the user profile, including information from the shopping session.

If the decision is to browse information, information access is provided at module 560. Such information access may be shaped based on profile contents, either by emphasizing potential topics, or by presenting a group of topics expected to be of interest to the user for example. At module 565, actual browsing by the user is monitored, adding further information to the user profile. When browsing terminates, the process moves to module 530, at which point a next test is suggested based on the current contents of the user profile, including information from the information browsing session.

If the decision is to log out, at module 570 the session is ended. At module 575, the process awaits a login by the user. At module 580, the user logs back in. At module 585, changes to a user profile occurring while the user was not logged in are processed, such as information submitted by people solicited to evaluate the user or information from evolving statistical models for example. The process then moves to module 530, at which point a next test is suggested based on the current contents of the user profile, including information from the changes or data processed.

Note that opportunities for monetization abound within the method of FIG. 5. For example, a test may be sponsored by a sponsor, with the test subject matter related to the sponsor's products and/or services. Similarly, browsing information may be monetized based on what information is accessed or the time and/or bandwidth taken to access the information. Such monetization may be based on a user paying a subscription fee or on a user viewing or otherwise perceiving an advertisement or information from a sponsor, with the sponsor paying the sum involved in monetization. Monetization in each of the methods or embodiments may also be related to levels of feedback for results from a test or set of tests. Moreover, monetization may be involved in soliciting input from external sources of data such as friends, relatives or co-workers. Additionally, joining groups or setting up matches between users may be accomplished based on apparent compatibility within respective profiles, and monetization may be involved therein.

Figure 6:
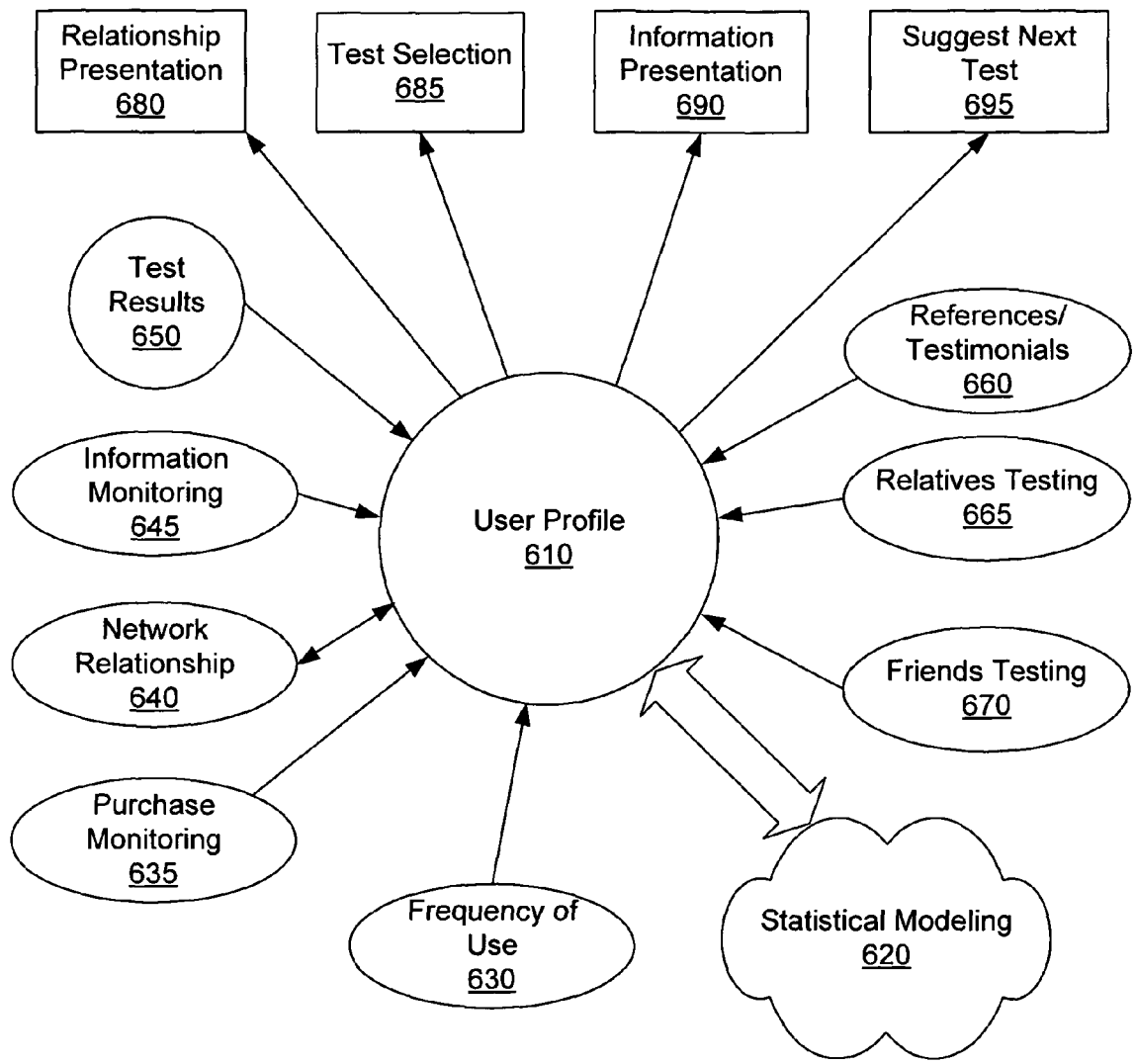
FIG. 6 illustrates relationships between an individual profile and various sources of data or data stores in one embodiment.

A progressive system for managing an interface with a user may utilize a variety of relationships between the user and various sources of data. FIG. 6 illustrates relationships between an individual profile and various sources of data or data stores in one embodiment. The relationships with a user (and conduits for the user profile) fall into four broad categories (user activated, related user activated, statistical modeling, and presentation to the user) in one embodiment.

User profile 610 represents a collection of data about a user. This may include attribute-value pairs, histories of browsing and testing, pointers to related members in the network, and other representations of data. This data may correspond to test results, personal characteristics, histories as mentioned, connections to people related by family, social, occupational and other links, and other forms of information.

Sources of information can be grouped into three categories: user-created information, related-user information, and statistical information. User-created information includes frequency of use 630 (how often a user logs in, how long sessions last for example), purchase monitoring 635, network relationships 640 (who the user is connected to within a network of users), information monitoring 645 (indications of what a user browses within a website for example), and test results 650. Each of these sources of information comes directly from user actions, and relates specifically to the user in question.

Related-user information includes references or testimonials 660, testing of relatives 665, and testing of friends 670. References or testimonials 660 may be solicited directly by the user or indirectly through a website implementing a network of members or users. Such references or testimonials 660 may include standardized evaluations of users or free-form evaluations of users, and may be monetized, such as by a fee for obtaining and/or processing the information. Relatives and friends may be determined based on membership within a network of members or users, in which the friends or relatives are pointed to by the user profile 610. Such relatives or friends may be identified by the user, or may be deduced by user activity (email exchanges for example) and characteristics (same address for example). Results of relatives testing 665 and friends testing 670 may reflect on the user based on whom the user is related to or associates with.

Statistical modeling 620 involves aggregating information from a (preferably) statistically significant number of users and extracting trends or correlations between variables therein. Data from user-created information and related-user information sources in a user profile 610 may be aggregated, allowing for prediction of unknown information within a user profile 610. For example, if most people in San Francisco with library cards tend to buy books, a user in San Francisco with a library card may be predicted to be interested in books.

Such predictions may be used in conjunction with the process of selecting tests to present, information to present, merchandise to present and potential relationships to present. Relationship presentation 680 may be a module of an application (such as application 100 for example) which suggests people who would be good matches as friends, potential spouses, or other forms of acquaintances. Test selection 685 may be a module of an application (such as application 100 for example) which selects a next test based on information in the user profile 610, both to help the user become more self-aware and to collect more data for the user profile 610.

Information presentation 690 may be a module of an application (such as application 100 for example) which determines what topics of information should be presented or emphasized when a user browses an informational website, based on user profile information and potentially statistical modeling information. Merchandise presentation 695 may be a module of an application (such as application 100 for example) which indicates what merchandise (goods and/or services) should be presented or emphasized when a user browses a sales portion of a website.

Figure 7:
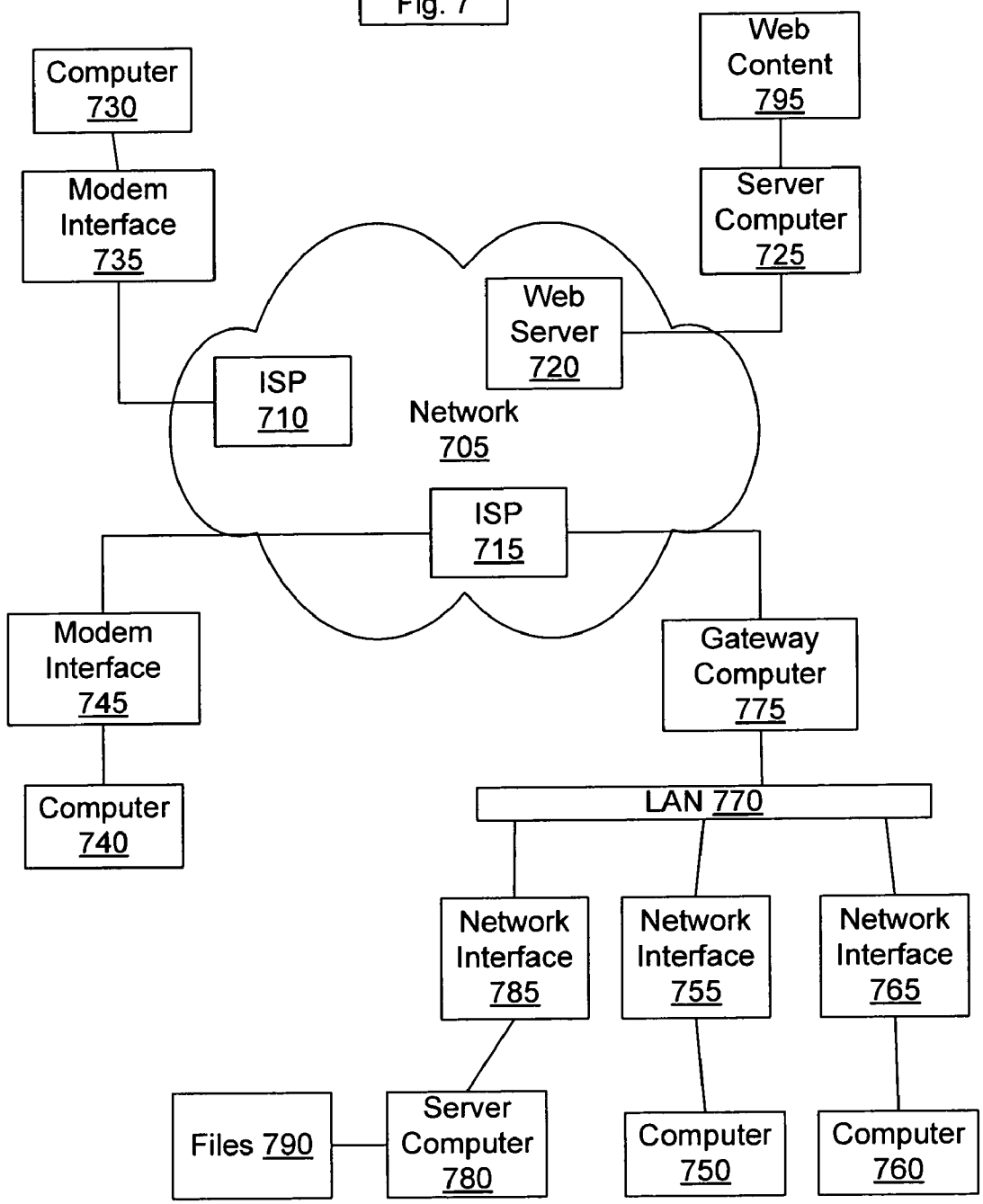
FIG. 7 illustrates an embodiment of a networked system.
Figure 8:
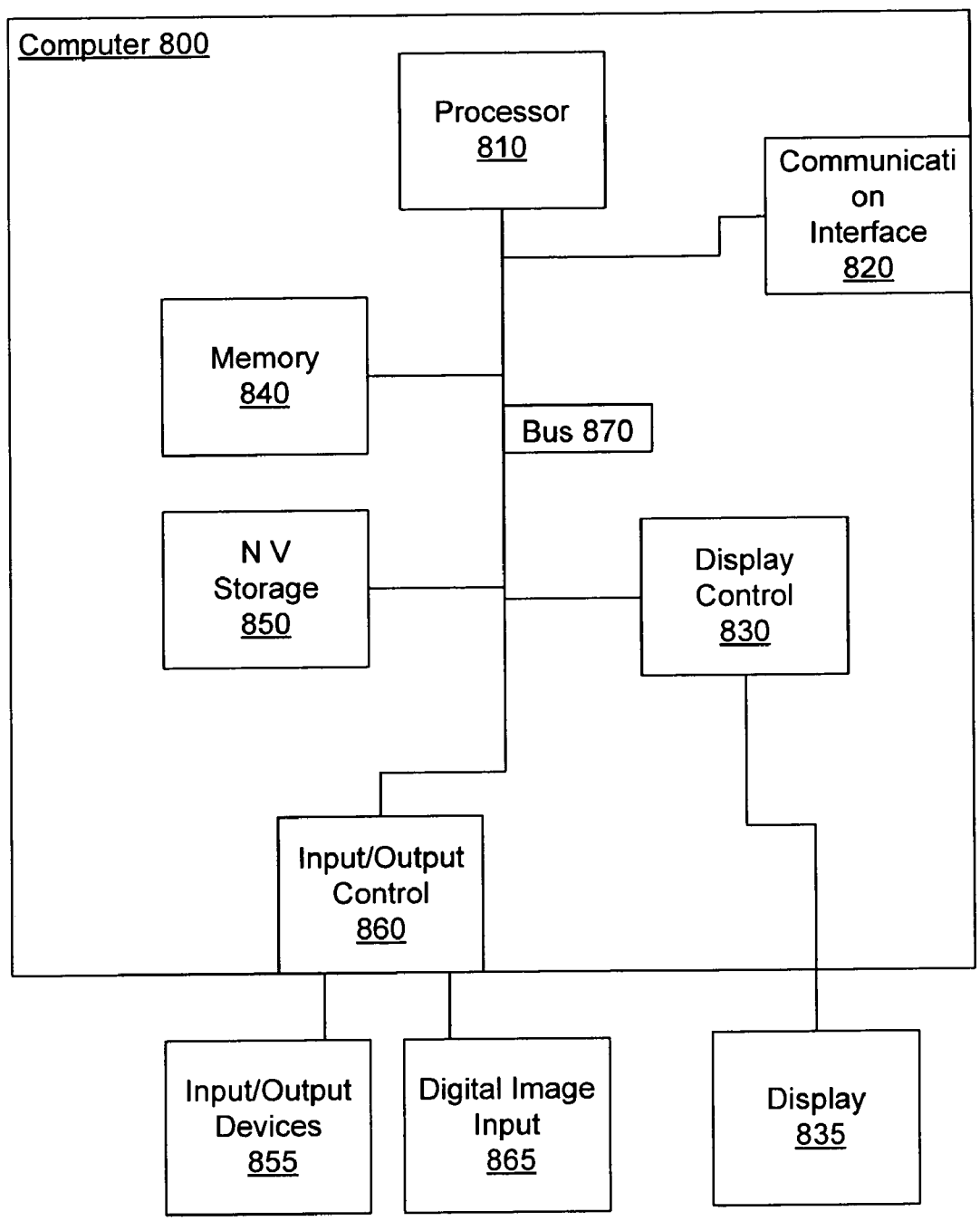
FIG. 8 illustrates an embodiment of a computer or machine that may be used in the system of FIG. 7.

The following description of FIGS. 7-8 is intended to provide an overview of computer hardware and other operating components suitable for performing the methods of the invention described above, but is not intended to limit the applicable environments. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled through a network 705, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 that is considered to be "on" the Internet. Often these web servers are provided by the ISPs, such as ISP 710, although a computer system can be set up and connected to the Internet without that system also being an ISP.

The web server 720 is typically at least one computer system which operates as a server computer system and is configured to operate with the protocols of the World Wide Web and is coupled to the Internet. Optionally, the web server 720 can be part of an ISP that provides access to the Internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 that can be considered part of the client computer system 730. The client computer system can be a personal computer system, a network computer, a Web TV system, or other such computer system.

Similarly, the ISP 715 provides Internet connectivity for client systems 740, 750, and 760, although as shown in FIG. 7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, ISDN modem, cable modem, satellite transmission interface (e.g. "Direct PC"), or other interfaces for coupling a computer system to other computer systems.

Client computer systems 750 and 760 are coupled to a LAN 770 through network interfaces 755 and 765, which can be Ethernet network or other network interfaces. The LAN 770 is also coupled to a gateway computer system 775 that can provide firewall and other Internet related services for the local area network. This gateway computer system 775 is coupled to the ISP 715 to provide Internet connectivity to the client computer systems 750 and 760. The gateway computer system 775 can be a conventional server computer system. In addition, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 8 shows one example of a conventional computer system that can be used as a client computer system or a server computer system or as a web server system. Such a computer system can be used to perform many of the functions of an Internet service provider, such as ISP 710. The computer system 800 interfaces to external systems through the modem or network interface 820. It will be appreciated that the modem or network interface 820 can be considered part of the computer system 800. This interface 820 can be an analog modem, ISDN modem, cable modem, token ring interface, satellite transmission interface (e.g. "Direct PC"), or other interfaces for coupling a computer system to other computer systems.

The computer system 800 includes a processor 810, which can be a conventional microprocessor such as an Intel Pentium microprocessor or Motorola Power PC microprocessor. Memory 840 is coupled to the processor 810 by a bus 870. Memory 840 can be dynamic random access memory (DRAM) and can include static RAM (SRAM). The bus 870 couples the processor 810 to the memory 840, also to non-volatile storage 850, to display controller 830, and to the input/output (I/O) controller 860.

The display controller 830 controls in the conventional manner a display on a display device 835 that can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems that have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to different bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software that includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here generally conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

We claim:

1. A non-volatile storage storing executable instructions, the instructions, when executed by a processor, causing the processor to perform a method, the method comprising:
   receiving offer data for propagation;
   extracting offer characteristics from the received offer data;
   determining a propagation user group based on correlating extracted offer characteristics and common user profile characteristics, wherein the user profile characteristics are aggregated through progressive testing;
   selecting a high proliferate user from the correlated user group as a connector user;
   providing the offer to the connector user for propagation to the group of users; and
   facilitating a transaction based on the propagated offer provided by the connector user.

2. The non-volatile storage of claim 1, wherein:
   accessing a database to determine correlated user profile characteristics of users that have taken an initial test with initial testing results used to determine subsequent tests as progressive testing; and
   updating user profile characteristics with progressive test results.

3. The non-volatile storage of claim 2, wherein:
   processing progressive test results to identify similar user profile characteristics.

4. The non-volatile storage of claim 3, wherein:
   the statistical results include user-created information, related-user information, and historical usage information.

5. The non-volatile storage of claim 4, wherein:
   compensating the connector user with a predetermined benefit upon completion of the transaction.

6. The non-volatile storage of claim 1, wherein:
   the offer is a group offer or a circulating coupon or a progressive coupon.

7. The non-volatile storage of claim 6, wherein:
   the offer requires a predetermined number or percentage of acceptances to be activated.

8. The non-volatile storage of claim 1, wherein:
   the offer is a sponsored offer.

9. The non-volatile storage of claim 1, wherein:
   the transaction is completed with users conditioned on analysis of contents of associated profiles of the users.

10. The non-volatile storage of claim 1, wherein:
    identity of the connector user is provided to a vendor sponsoring the offer responsive to receipt of a fee.

11. An apparatus for offer distribution, comprising:
    a memory;
    a processor disposed in communication with said memory, and configured to issue a plurality of processing instructions stored in the memory, wherein the processor issues instructions to:
    receiving offer data for propagation;
    extracting offer characteristics from the received offer data;
    determining a propagation user group based on correlating extracted offer characteristics and common user profile characteristics, wherein the user profile characteristics are aggregated through progressive testing;
    selecting a high proliferate user from the correlated user group as a connector user;
    providing the offer to the connector user for propagation to the group of users; and
    facilitating a transaction based on the propagated offer provided by the connector user.

12. A computer implemented method for offer distribution, comprising:
    receiving offer data for propagation;
    extracting offer characteristics from the received offer data;
    determining, via the computer, a propagation user group based on correlating extracted offer characteristics and common user profile characteristics, wherein the user profile characteristics are aggregated through progressive testing;
    selecting a high proliferate user from the correlated user group as a connector user;
    providing the offer to the connector user for propagation to the group of users; and
    facilitating a transaction based on the propagated offer provided by the connector user.

13. The method of claim 12, wherein:
    accessing a database to determine correlated user profile characteristics of users that have taken an initial test with initial testing results used to determine subsequent tests as progressive testing; and
    updating user profile characteristics with progressive test results.

14. The method of claim 13, wherein:
    processing progressive test results to identify similar user profile characteristics.

15. The method of claim 12, wherein:
    the offer is a group offer or a circulating coupon or a progressive coupon.

16. The method of claim 15, wherein:
    the offer requires a predetermined number or percentage of acceptances to be activated.

17. The method of claim 12, wherein:
    the offer is a sponsored offer.

18. The method of claim 12, wherein:
    the transaction is completed with users conditioned on analysis of contents of associated profiles of the users.

19. The method of claim 12 wherein:

identity of the connector user is provided to a vendor sponsoring the offer responsive to receipt of a fee.

20. The method of claim 12, further comprising:

rewarding the connector user in proportion to a quantity of the responses from the group of users.

21. The method of claim 12, wherein:

the statistical results include user-created information, related-user information, and historical usage information.

22. The method of claim 21, wherein:

compensating the connector user with a predetermined benefit upon completion of the transaction.

* * * * *